United States Patent [19]

Kline

[11] 3,918,502
[45] Nov. 11, 1975

[54] CONTAINER FOR ANIMAL FEED
[76] Inventor: Joseph M. Kline, 3501 N. Valley St., Arlington, Va. 22207
[22] Filed: Feb. 11, 1974
[21] Appl. No.: 441,708

Related U.S. Application Data
[62] Division of Ser. No. 283,998, Aug. 28, 1972, Pat. No. 3,818,955.

[52] U.S. Cl. .................................. 150/1; 53/124 B
[51] Int. Cl.² ......................................... B65D 89/08
[58] Field of Search ........................................ 150/1

[56] References Cited
UNITED STATES PATENTS

| | | |
|---|---|---|
| 3,214,221 | 10/1965 | Finnegan ...................... 53/112 B X |
| 3,400,741 | 9/1968 | Robinson et al. ........................ 150/1 |
| 3,727,656 | 4/1973 | Luders ..................................... 150/1 |
| 3,818,955 | 6/1974 | Kline ............................. 53/112 B X |

Primary Examiner—Travis S. McGehee
Attorney, Agent, or Firm—A. Yates Dowell, Jr.

[57] ABSTRACT

Apparatus for harvesting and treating forage to be used as animal feed in which the forage is placed in flexible airtight containers and is treated to inhibit the growth of mold and fungus. Thereafter liquid and gaseous fluids within the container are evacuated and the container is sealed to preserve the nutritive value of the forage. Prior to sealing, inert gas may be inserted to raise the pressure substantially to atmospheric.

3 Claims, 12 Drawing Figures

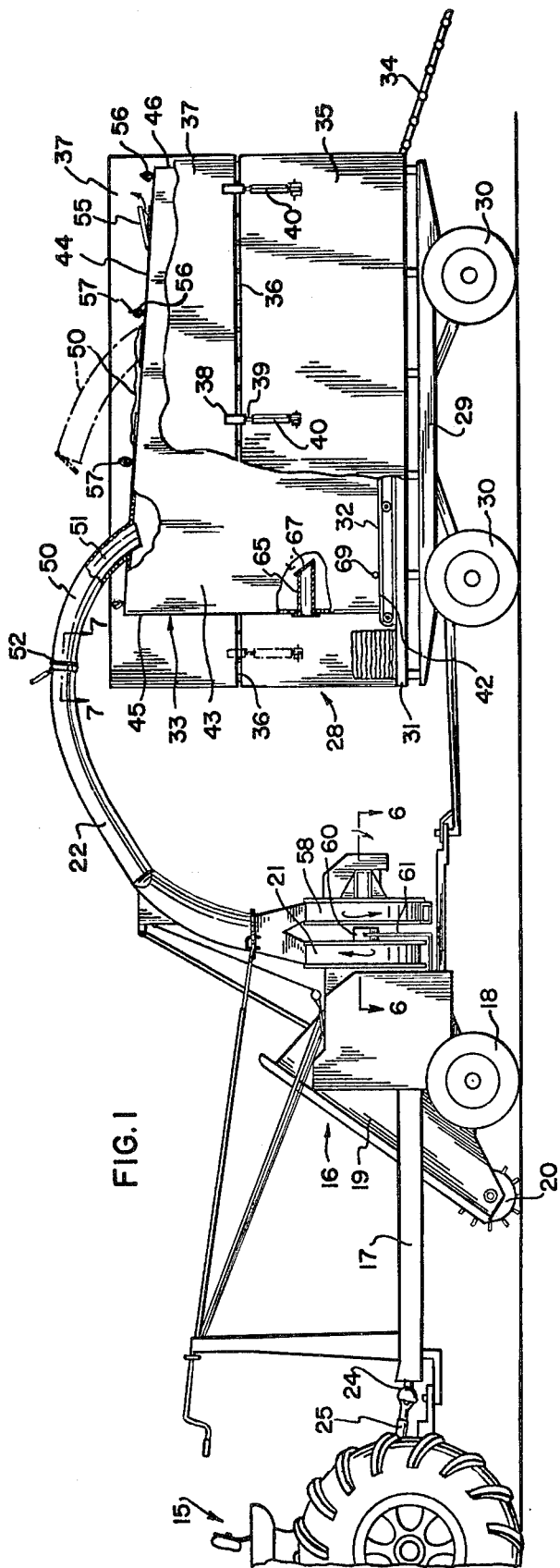

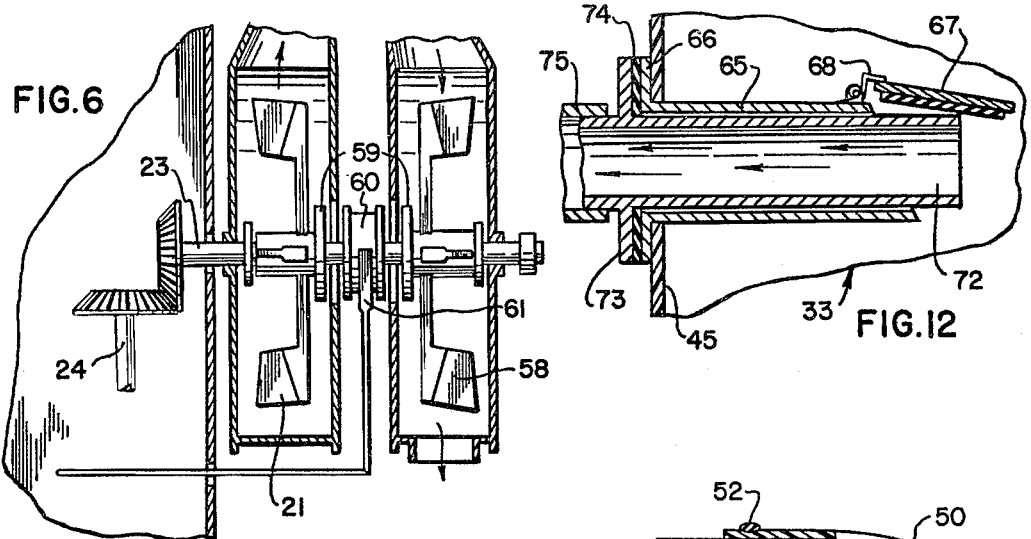
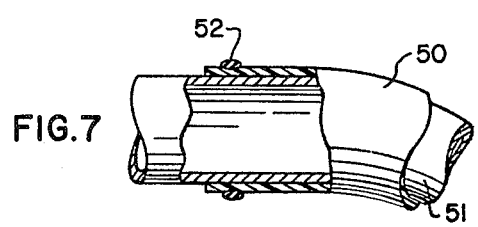
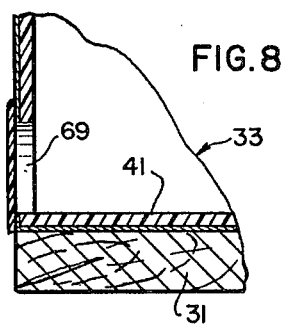
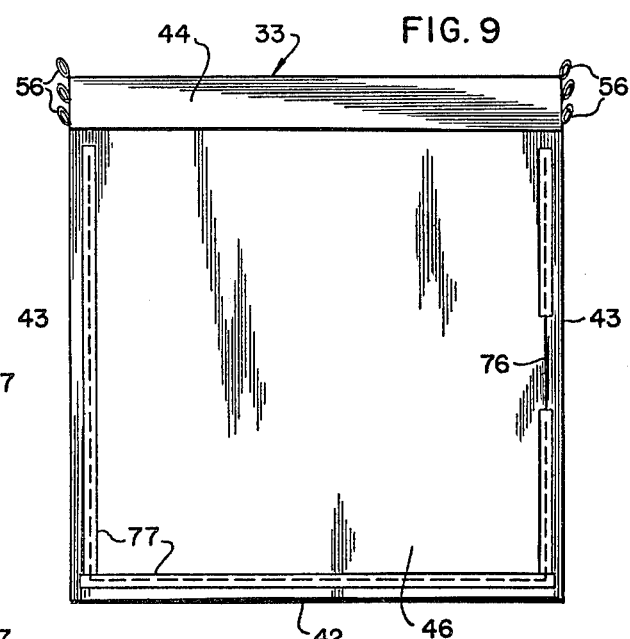
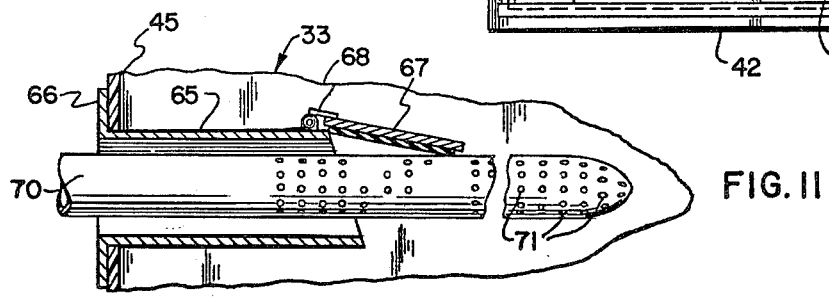

CONTAINER FOR ANIMAL FEED

This is a division of application Ser. No. 283,998 filed Aug. 28, 1972, now U.S. Pat. No. 3,818,955.

BACKGROUND OF THE INVENTION

1. Field of the Invention.

This invention relates generally to the harvesting and storing of food products of various kinds and relates particularly to the apparatus and method of harvesting and storing animal feeds in a manner to permit harvesting at the most desirable stage of growth of the forage material and to preserve the nutritive value thereof and thereby reduce the amount of supplemental feed material consumed by the animals.

2. Description of the Prior Art.

Historically, hay such as alfalfa, timothy, clover and other grasses have been cut and permitted to dry in the field to reduce the water content and thereafter such hay has been baled and placed in a barn so that the air curing process could continue. Hay harvested and baled in the conventional manner has sustained considerable loss due to oxidation, mold and other bacterial actions while stored, and therefore it has been necessary to cut and bale more hay than the animals will consume or to add supplements to the feed. Also the drying of the hay has substantially reduced the nutritive value so that a substantial amount of supplemental feed material, such as grain and the like, have been required to meet the demands of the animals.

Many farmers in addition to baling hay have harvested silage in the green state and have placed the silage in a substantially airtight silo under a partial vacuum or negative pressure without treatment and have permitted the silage to ferment to a lactic state. This does not adversely affect the cattle since most of the oxygen is slowly evacuated in the silo by compression to reduce oxidation of the silage. However, the airtight integrity of the silo must be maintained or atmospheric air can enter and the silage will mold as it does in many silos, particularly at the base.

Hay and silage are some of the best and least expensive sources of feed for livestock during the non-growing or winter season; however, it is important that such materials retain their nutritive value as well as their appeal to the animals. Many efforts have been made to treat hay, haylage and silage by the use of chemical substances of various kinds to prevent or arrest deterioration of the forage material. Also efforts have been made to heat forage material to destroy micro-organisms and spores and thereby sterilize such material. Even though the forage material has been treated by chemicals and heat, humidity and airborne micro-orgamisms re-enter the material unless the material is placed in an airtight container. Some examples of the prior art are the U.S. Pat. Nos. to Carter 2,815,621; Haase 3,050,396; and Gifford 3,496,977.

SUMMARY OF THE INVENTION

The present invention is an apparatus and method for harvesting and storing forage to be used as animal feed during the non-growing or winter season. The apparatus includes a flexible container having a plurality of sealable openings. Forage material is placed within such container with a minimum of effort and in a minimum of time so that the forage material can be harvested at the optimum stages of growth after which the material is treated in a manner to retain its nutritive value and the container is sealed to maintain the airtight integrity of the container and prevent oxidation of the forage material. During the filling stage, the container is subjected to vacuum to remove the air and compress the material. After filling, an inert gas may be introduced to raise the pressure to substantially atmospheric. The method is directed to the steps involved in the treating of the forage material as well as storing the material after treatment to simulate a portable silo.

It is an object of the invention to provide an efficient apparatus and method of harvesting, treating and storing forage material to be used as animal feed by placing the forage material in airtight containers, treating the material within the containers and evacuating fluids and air to prevent oxidation, as well as to compact the material within the containers with the minimal amount of labor and time in order to maintain the quality of the material at its maximum.

BRIEF DESCRIPTION OF THE DRAWINGS

FIG. 1 is a side elevation illustrating one application of the present invention.

FIG. 2 is a front elevation of a wagon illustrating a container in collapsed condition.

FIG. 3 is an enlarged fragmentary top plan view of a sealable exhaust opening in the upper portion of the container.

FIG. 4 is a section on the line 4—4 of FIG. 3.

FIG. 5 is an enlarged fragmentary section illustrating the wall structure of a container.

FIG. 6 is an enlarged section on the line 6—6 of FIG. 1.

FIG. 7 is an enlarged section on the line 7—7 of FIG. 1.

FIG. 8 is an enlarged fragmentary detailed section illustrating a drain opening in the lower side wall of the container.

FIG. 9 is a rear elevation of a container.

FIG. 10 is an enlarged section on the line 10—10 of FIG. 2.

FIG. 11 is an enlarged section similar to FIG. 10 illustrating apparatus for introducing fluid material into the container.

FIG. 12 is an enlarged section similar to FIG. 10 illustrating apparatus for removing fluid material from the container or injecting chemicals or gases.

DESCRIPTION OF THE PREFERRED EMBODIMENT

With continued reference to the drawings, a tractor 15 or other propelling vehicle of conventional character is provided having a forage thrower 16 connected thereto in a manner to trail behind the vehicle 15. The forage thrower 16 includes a frame 17 supported by ground-engaging wheels 18 and such frame supports a housing 19 having a pickup unit 20 at one end. A blower fan 21 at the rear of the thrower 16 receives hay, silage, haylage or other forage material from the pickup unit, chops it and airlifts such material upwardly through a spout 22. The fan 21 is mounted on a shaft 23 which is driven in any desired manner, such as a drive shaft assembly 24 connected to the power take-off of the tractor 15 in any desired manner, as by a telescoping universal drive connection 25. The structure thus far described is conventional in the prior art and forms no part of the invention.

A relatively large wagon 28 is connected behind the forage thrower 16 and such wagon has a frame 29 supported by ground-engaging wheels 30. A bed 31 is carried by the frame 29 and preferably such bed supports a conveyor 32 on which a relatively large flexible collapsible container 33 is mounted. If desired, an off-feed conveyor 34 is provided for discharging the container 33 from the wagon. The container 33 may be of any desired size, although a container approximately 16 feet long, 6 to 7 feet wide, and 6 to 8 feet high is contemplated.

With reference to FIGS. 1 and 2, the wagon 28 is provided with upstanding lower side walls 35 on opposite sides thereof and such lower side walls are connected by hinges 36 to upper side walls 37 at each side. Each of the upper side walls has a plurality of outwardly extending lugs 38 which are pivotally connected to the free end of piston rods 39 carried by fluid cylinders 40 and such cylinders in turn are swingably connected to outwardly extending lugs 41 fixed to the lower side walls 35 for a purpose which will be described later. Fluid cylinders 40 are supplied with fluid under pressure from any desired source (not shown) such as the hydraulic system of the propelling vehicle, or an independent compressed air or oil system carried by the wagon 28 or tractor.

With particular reference to FIG. 1, the container 33 includes a bottom wall 42, side walls 43, a top wall 44, and front and rear end walls 45 and 46, respectively. For convenience in loading and unloading the container, the front wall 45 may be somewhat higher than the rear wall 46 and the top wall 44 slopes downwardly from front to rear of the container. The walls 42–46 can be made of any flexible collapsible material which will prevent the flow of air therethrough including synthetic organic polymeric thermoplastic resin material such as cellulose acetate, cellulose acetate butyrate, polyethylene, polystyrene, flexible vinyl, oriented polyester and the like. The material can be transparent, translucent, or opaque and if desired could be bonded to metallic foil 47 (FIG. 5) or the like and normally has a thickness of approximately 0.010 inch sufficient to withstand farm handling and injury to the container.

At the top of the container 33 one or more flexible inlet sleeves 50 of substantially tubular construction are bonded to the top wall 44 and provide communication from the exterior through an opening in such top wall. A metal tubular extension 51 is connected to the discharge end of the spout 22 and such extension is received within an inlet sleeve 50 so that forage material from the forage thrower 16 is discharged directly into the container 33. The inlet sleeve 50 is secured to the tubular extension 51 in any desired manner, as by a flexible elastic strap 52 or the like. After the container has been filled, the inlet sleeve 50 is sealed in any desired manner, as by the application of heat to fuse opposite sides together, or by a suitable adhesive, or if desired the sleeve can be twisted or rolled upon itself or can be folded and taped closed.

While forage material is being airlifted into the container 33, most of the inflow is atmospheric air which must be permitted to escape so that the forage material can continue to be introduced. In order to do this, an opening 53 is provided in the top wall 44 and such opening may have a reinforced bead 54 to resist tearing of the top wall material. A flapper type valve 55 is mounted adjacent to the opening 53 to permit air within the container to escape but which prevents air from entering the container when the introduction of material into the container is interrupted.

As illustrated in FIGS. 1 and 9, the upper portions of the container 33 are provided with a plurality of loops 56 supported by hangers 57 on opposite sides of the upper side walls 37 of the wagon. The loops maintain the container in expanded position while such container is being filled with forage material.

Periodically, to assist in compacting the forage material within the container 33, it is desirable to interrupt the flow of material into the container and to evacuate the air there in so that the walls of the container collapse about the forage material and compact the same so that a greater amount of material can be placed within the container. This is accomplished by providing a suction fan 58 which is adapted to be driven by the shaft 23. In order to selectively drive the blower fan 21 or the suction fan 58, both of such fans are freely rotatably mounted on the shaft 23 and each of such fans is provided with a clutch plate 59 (FIG. 6). A shiftable clutch 60 is slidably connected to the shaft 23 as by a spline or the like (not shown) which permits lengthwise movement of the clutch but positively rotates the clutch when the shaft 23 is driven. The apparatus for shifting the clutch 60 includes a shifting fork 61 controlled by the operator of the tractor 15. The clutch 60 may be selectively disposed in an intermediate position, as illustrated in FIG. 6, with neither of the fans being driven, or such clutch can be shifted to engage either clutch plate 59 to selectively drivingly connect either fan to the shaft 23.

When the suction fan 58 is being operated, air is evacuated from the container 33 and the flapper valve 55 closes the opening 53 to prevent additional air from entering the container 33. Simultaneously fluid cylinders 40 at the sides of the wagon 28 are operated to extend the piston rods 39 and cause the upper side walls 37 to pivot inwardly and downwardly, as illustrated in FIG. 2, to mechanically compact the forage material and assist in the evacuation of air from the container.

At various times during the filling operation, chemical materials for retarding fungus and bacterial activity may be applied, as by spraying or from a drip supply. These should be of a nature which will not be harmful to the animal and comply with appropriate regulations. Among these are propionic acid and formic acid.

After a container is filled with material and the air evacuated, it is preferable that the pressure therewithin be restored substantially to atmospheric in order to avoid seepage of air into the container. This is preferably accomplished by introducing an inert gas such as nitrogen or carbon dioxide until the bag becomes slightly loose.

The last step of restoring the pressure may be deferred until after the contents is heat treated if a heat treatment step is employed.

After a container has been filled with material, such container is discharged from the wagon 28 by means of the conveyor 32 and the off-feed conveyor 34 and such container may be left in the field or may be transferred to a truck or other vehicle which transports the container to a barn or other storage facility. As soon as the container is discharged from the wagon, another container from a supply at the front of the wagon can be unfolded and the loops 56 placed on the hangers 57 so that the operation can continue.

Containers which have been placed in a barn may be treated with heated air to dry the forage, after which the material may be evacuated and an inert gas introduced.

In order to apply chemical materials or heated air to the material within the container, a short inlet tube 65 extends through the front wall 45 and such tube has a flange 66 by means of which the tube is bonded to the front wall. The inner end of the tube 65 is provided with a flapper valve 67 normally held in sealing position over the inner end of such tube by a relatively strong spring 68. One or more openings 69 (FIG. 8) can be provided along the side walls 43 adjacent to the bottom wall 42 so that excess moisture or other fluid can escape from the container.

An elongated tubular member 70 having perforations 71 along its length is inserted through the inlet tube 65 and caused to penetrate substantially the full length of the forage material within the container. The opposite end of the tubular member 70 is connected to a source of chemical materials or hot air or other heating means (not shown) which passes through the tubular member and escapes through the perforations 71 to the forage material. Moisture and condensation from the material flows by gravity to the bottom of the container and escapes through the openings 69.

Following heating, when the moisture content of the material has been reduced to a desired level, the openings 69, inlet sleeve 50, and outlet opening 53 in the top wall 44 are sealed with an adhesive tape or the like. Thereafter the tubular member 70 is removed from the tube 65 and an evacuation nozzle 72 is inserted therein. The nozzle 72 includes a flange 73 having a gasket 74 adapted to engage the flange 66 of the tube and provide an airtight seal so that atmospheric air cannot enter the container. The nozzle 72 is connected to one end of a hose 75 the opposite end of which is connected to a conventional vacuum pump or other source of negative pressure in order to evacuate the container. Then, an inert gas such as nitrogen or carbon dioxide is introduced to raise the pressure to substantially atmospheric.

During this operation, the walls of the container collapse under atmospheric pressure and compress the forage material within the container. When the nozzle 72 is removed, the flapper valve 67 immediately closes to prevent the ingress of atmospheric air due to the pressure differential between the interior and the exterior of the container. If desired, an additional piece of tape can be applied over the outer end of the tube 65 to insure that no air enters the container. Due to the lack of oxygen within the container, fermentation and oxidation are substantially delayed or prevented and the hay, haylage or silage retains its original nutritive value to a higher degree for a longer period of time.

If the material being harvested is to be preserved as silage, the heat treating step and the introduction of chemical material may be eliminated. However, the atmospheric air within the container is evacuated by vacuum. In this process, fermentation can proceed, however, oxidation is substantially reduced due to the absence of atmospheric air within the container.

In the operation of the device, it is desirable to harvest forage at a relatively immature stage of growth or substantially at the bud stage, at which time the plants are high in energy, high in protein, and low in fiber. If the forage is to be harvested as hay, such forage can be cut and cracked in the morning and can be harvested late in the afternoon or the next day, depending upon weather conditions. If the forage material is to be harvested as silage, it can be cut and harvested simultaneously regardless of weather conditions, as long as it is not too wet.

The forage material is picked up by the thrower 16 and the blower fan 21 airlifts the material through the spout 22 and through the extension 51 and inlet sleeve 50 into the container 33. At various times chemical treating materials may be introduced. Periodically the tractor may be stopped and the shifting fork 61 operated to move the clutch 60 to operate the suction fan 58 to evacuate air from the container. Simultaneously fluid under pressure is introduced into the cylinders 40 to cause the upper side walls 37 of the wagon to swing inwardly and permit the container 33 to collapse and compact the forage material therein. After the container is filled, inert gas is preferably introduced to restore it to normal atmospheric pressure, unless it is to be further heat treated at this time.

After the container has been filled, it is discharged from the wagon in any field or can be placed in a barn. In effect it is a portable silo. If the material is to be treated as hay and is not very dry, heated air may be supplied to the forage material through the inlet tube 65 by means of the elongated tubular member 70. When the material has been heated sufficiently, a chemical material and/or gas is introduced through the elongated member 70 to drive off the oxygen contained in the atmospheric air, as well as to retard fungus and bacterial activity. After the openings of the container have been sealed, an evacuation nozzle is applied to the inlet tube 65 to evacuate substantially all of the gases within the container and permit the walls of the container to collapse onto the forage material therein. Then an inert gas is introduced to restore the pressure to substantially atmospheric.

When the forage material is to be dispensed from the container, one end of the container or side is slit by a knife or other sharp implement, as indicated at 76, to provide a relatively large flap which is raised that provides access to the contents of the container. The contents can be dispensed in any desired manner, as manually or by a fork lift truck, front end loader or the like. After the contents have been dispensed, the slit 76 is closed and sealed in any desired manner, as by a tape 77, and reused if desired.

I claim:

1. A portable elongated container for use with an apparatus for harvesting and storing forage for subsequent use as animal feed and having a forage thrower with a discharge chute and a discharge end, a housing having upright walls located adjacent to the thrower and having means for selectively collapsing at least portions of the walls inwardly, said container comprising wall structure of flexible fluid-impermeable thermoplastic material, said container being removably mountable within the housing, an inlet sleeve connected to the top of said wall structure and providing ingress into said container, said inlet sleeve receiving the discharge end of the forage thrower chute so that the forage from the thrower is discharged directly into said container, a first opening in the top of said wall structure in spaced relationship to said inlet sleeve, a first one-way valve normally closing said first opening, said first valve being operable by pressure within said container for discharging air from said container through said first opening, a second opening in the wall of said container, a second one-way valve normally closing said second opening, said second valve normally being closed while forage is being introduced into said container but selectively receiving nozzle means which automatically opens the same, and means for closing and sealing said inlet sleeve and said first valve after the container has been filled with forage, whereby said container may be periodically collapsed during filling to evacuate the air and compact the forage and the container is sealed against the ingress of fluid after being filled.

2. The structure of claim 1 including means on said container for mounting portions of said container on the housing.

3. A portable container for use with an apparatus for harvesting and storing forage for subsequent use as animal feed and having a forage thrower with a discharge chute and a discharge end, said container comprising wall structure of flexible fluid-impermeable thermoplastic material, an inlet sleeve connected to the top of said wall structure and providing ingress into said container, said inlet sleeve receiving the discharge end of the forage thrower chute so that the forage from the thrower is discharged directly into said container, a first opening in the top of said wall structure in spaced relationship to said inlet sleeve, a first one-way valve normally closing said first opening, said first valve being operable by pressure within said container for discharging air from said container through said first opening, a second opening in the wall of said container, a second one-way valve normally closing said second opening, said second valve normally being closed while forage is being introduced into said container but selectively receiving nozzle means which automatically opens the same, and means for closing and sealing said inlet sleeve and said first valve after the container has been filled with forage, whereby said container may be periodically collapsed during filling to evacuate the air and compact the forage and the container is sealed against the ingress of fluid after being filled.

* * * * *